(12) United States Patent
Chikayama et al.

(10) Patent No.: US 9,915,858 B2
(45) Date of Patent: Mar. 13, 2018

(54) COOLING DEVICE AND PROJECTION-TYPE IMAGE DISPLAY APPARATUS

(71) Applicant: PANASONIC INTELLECTUAL PROPERTY MANAGEMENT CO., LTD., Osaka (JP)

(72) Inventors: Manabu Chikayama, Osaka (JP); Shigekazu Yamagishi, Osaka (JP); Shu Namba, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/397,456

(22) Filed: Jan. 3, 2017

(65) Prior Publication Data

US 2017/0192346 A1 Jul. 6, 2017

(30) Foreign Application Priority Data

Jan. 6, 2016 (JP) ................................. 2016-000789
May 31, 2016 (JP) ................................. 2016-109231

(51) Int. Cl.
*G03B 21/16* (2006.01)
*H04N 9/31* (2006.01)
(Continued)

(52) U.S. Cl.
CPC ........... *G03B 21/16* (2013.01); *G02B 26/008* (2013.01); *G03B 21/204* (2013.01);
(Continued)

(58) Field of Classification Search
CPC ...... G03B 21/16; G03B 21/14; G03B 21/145; G03B 21/204; H04N 9/3114; H04N 9/3117; H04N 9/3144; H04N 9/3141
(Continued)

(56) References Cited

U.S. PATENT DOCUMENTS

2008/0018863 A1* 1/2008 Hsiao ..................... G03B 21/16
353/54
2008/0049345 A1* 2/2008 Niwa ................... G02B 26/008
359/889
(Continued)

FOREIGN PATENT DOCUMENTS

JP  2008-052176 A  3/2008
JP  2011-134668 A  7/2011
(Continued)

*Primary Examiner* — William C Dowling
*Assistant Examiner* — Ryan Howard
(74) *Attorney, Agent, or Firm* — McDermott Will & Emery LLP

(57) ABSTRACT

A cooling device cools down a wheel having a disc shape. The wheel is hermetically enclosed in an enclosure and rotationally driven about a rotation shaft. The cooling device includes blade members that are disposed on one surface of the wheel, a heat dissipater to which a gas heated by the wheel is blown by the blade members due to rotation of the wheel, and a gas flow definer that is located inside the enclosure, and separates a flow path along which the gas that has been cooled by the heat dissipater flows before being blown to the one surface and a flow path along which the gas that has been blown to the one surface and heated flows.

13 Claims, 19 Drawing Sheets

(51) Int. Cl.
*G03B 21/20* (2006.01)
*G02B 26/00* (2006.01)

(52) U.S. Cl.
CPC ......... *H04N 9/3114* (2013.01); *H04N 9/3158* (2013.01); *H04N 9/3144* (2013.01)

(58) Field of Classification Search
USPC .......................................................... 353/84
See application file for complete search history.

(56) References Cited

U.S. PATENT DOCUMENTS

| | | | |
|---|---|---|---|
| 2012/0013854 A1* | 1/2012 | Nishimura | G03B 21/16 353/57 |
| 2013/0169938 A1* | 7/2013 | Huang | G03B 21/16 353/31 |
| 2013/0250599 A1* | 9/2013 | Owada | F21S 48/125 362/520 |
| 2013/0301237 A1 | 11/2013 | Finsterbusch et al. | |

FOREIGN PATENT DOCUMENTS

| | | |
|---|---|---|
| JP | 2012-181431 A | 9/2012 |
| JP | 2014-503110 A | 2/2014 |

* cited by examiner

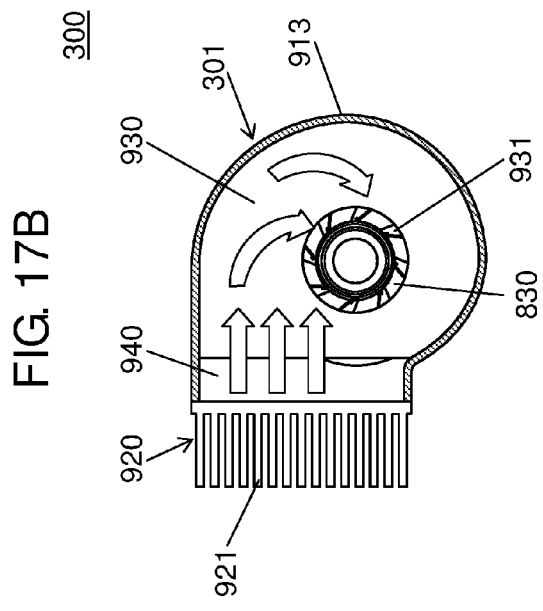
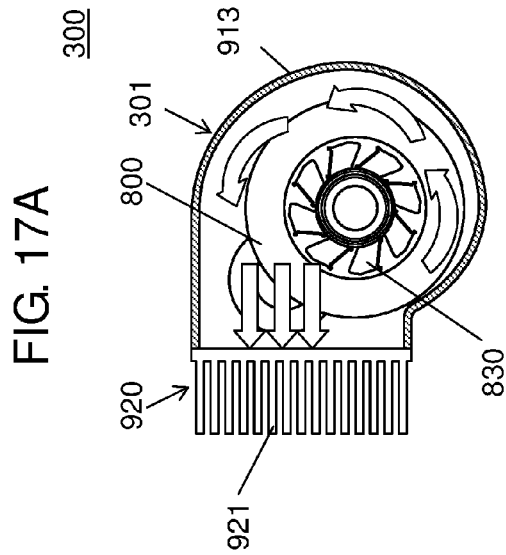
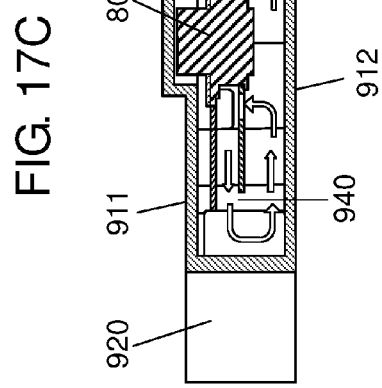

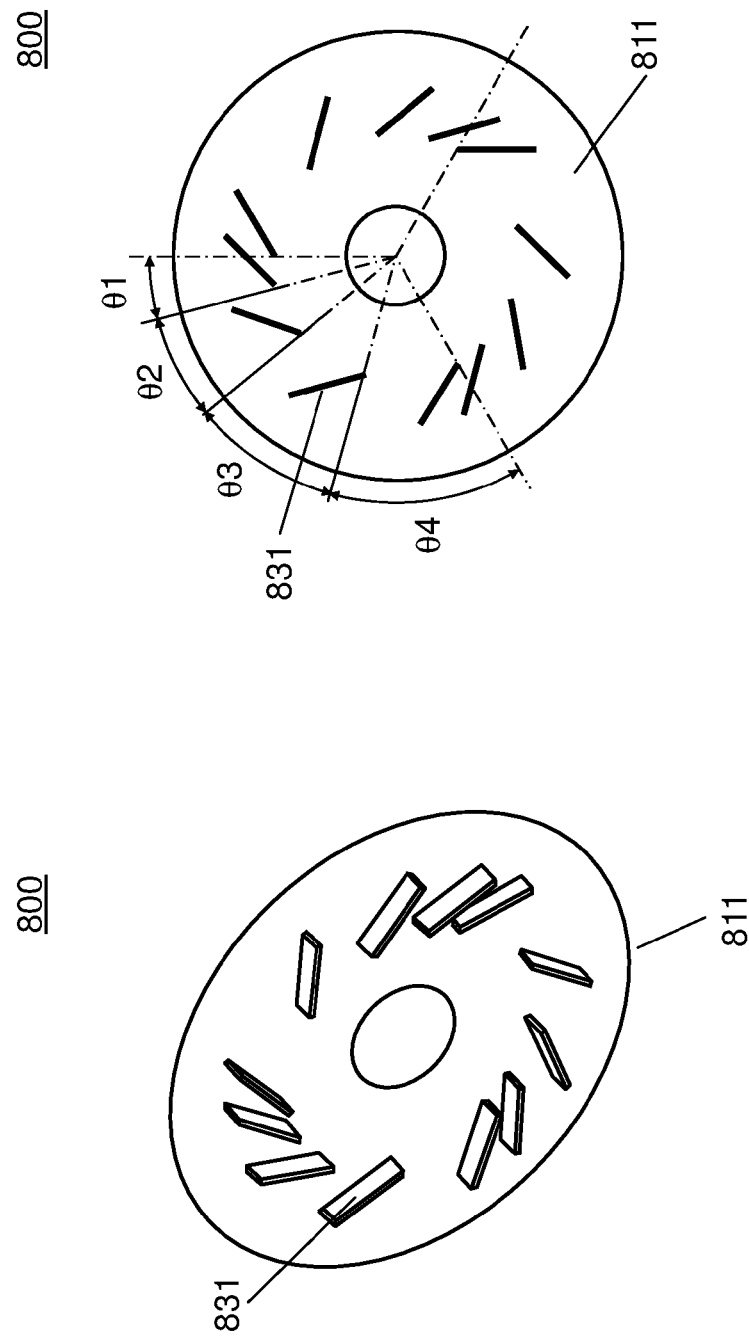

COOLING DEVICE AND PROJECTION-TYPE IMAGE DISPLAY APPARATUS

RELATED APPLICATIONS

This application claims the benefit of Japanese Application No. 2016-000789, filed on Jan. 6, 2016, and Japanese Application No. 2016-109231, filed on May 31, 2016, the disclosures of which Applications are incorporated by reference herein.

BACKGROUND

1. Technical Field

The present disclosure relates to a cooling device and a projection-type image display apparatus including the cooling device.

2. Description of the Related Art

Japanese Unexamined Patent Application Publications No. 2012-181431 and No. 2011-134668 each disclose a structure that cools down a disc-shaped wheel housed and rotationally driven in a light source device of a projector. More specifically, centrifugal fans are disposed in opposition to each other on an axis of rotation of the wheel, and blades of the centrifugal fans turn around together with the rotation of the wheel, thereby blowing the air to cool down the wheel.

SUMMARY

In order to prevent adhesion of dust, the wheel may be hermetically enclosed in an enclosure. However, when the wheel is hermetically enclosed in the enclosure, the air temperature in the enclosure rises, resulting in insufficient cooling of the wheel even if the air is blown by the fans toward the wheel.

The present disclosure provides a cooling device capable of appropriately cooling down a disc-shaped wheel hermetically enclosed in an enclosure and rotationally driven about a rotation shaft, and a projection-type image display apparatus including the cooling device.

A cooling device disclosed herein cools down a wheel having a disc shape, the wheel being hermetically enclosed in an enclosure and rotationally driven about a rotation shaft. The cooling device includes a plurality of blade members that are disposed on one surface of the wheel, a heat dissipater to which a gas heated by the wheel is blown by the plurality of blade members due to rotation of the wheel, and a gas flow definer that is located inside the enclosure, and separates a flow path along which the gas that has been cooled by the heat dissipater flows before being blown to the one surface and a flow path along which the gas that has been blown to the one surface and heated flows.

The present disclosure provides a cooling device capable of appropriately cooling down a disc-shaped wheel hermetically enclosed in an enclosure and rotationally driven about a rotation shaft, and a projection-type image display apparatus including the cooling device.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 17A illustrates how the air flows between the gas flow definer and the phosphor wheel inside the enclosure in Embodiment 3;

FIG. 17B illustrates how the air flows between the gas flow definer and the second wall portion inside the enclosure in Embodiment 3;

FIG. 17C illustrates how the air flows inside the enclosure in Embodiment 3 by viewing from direction C a cross section of the enclosure taken along line 17C-17C in FIG. 14;

FIG. 19A is a perspective view illustrating a blade-portion-provided surface of a phosphor wheel in Embodiment 4; and FIG. 19B is a plan view illustrating the blade-portion-provided surface of the phosphor wheel in Embodiment 4.

DETAILED DESCRIPTION OF THE EMBODIMENTS

The following is a detailed description of non-limiting embodiments, with reference to the accompanying drawings. It should be noted however that an overly detailed description may be omitted in some cases. For example, a detailed description of a well-known matter or a redundant description of substantially the same structural components will be sometimes omitted. This is to avoid unneeded redundancy in the following description and facilitate understanding of a person having an ordinary skill in the art.

It should be noted that the inventor(s) of the present application will provide the attached drawings and the following description in order for a person having an ordinary skill in the art to fully understand the present disclosure, and will not intend to limit the subject matter recited in the claims by these drawings and description.

Embodiment 1

In the following description, one surface denotes a surface of a metal substrate or a wheel provided with a wheel blade or a blade portion, whereas the other surface denotes a surface of the metal substrate or the wheel provided with a phosphor.

In the following, non-limiting Embodiment 1 will be described, with reference to FIG. 1 to FIG. 8.

[1. Configuration]

Figure 1:
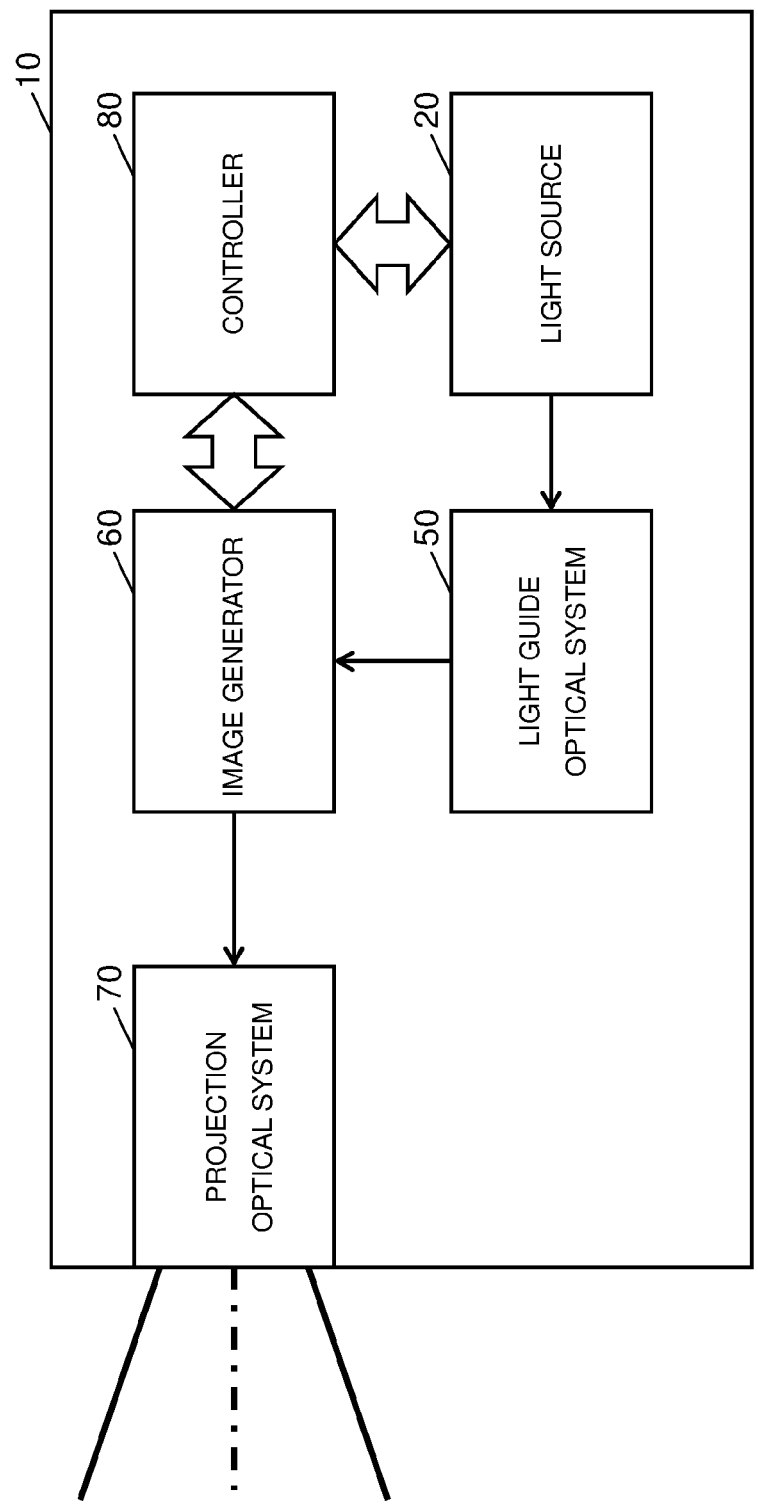
FIG. 1 is a block diagram illustrating a configuration of a projection-type image display apparatus in Embodiment 1.

FIG. 1 is a block diagram illustrating a configuration of projection-type image display apparatus 10 in Embodiment 1. Projection-type image display apparatus 10 includes light source 20, light guide optical system 50, image generator 60, projection optical system 70, and controller 80.

Light source 20 includes, for example, a solid light source such as a semiconductor laser and a phosphor, and emits light toward light guide optical system 50 under control of controller 80.

Light guide optical system 50 includes optical members such as lenses of various kinds, a mirror, or a rod, and directs light incident from light source 20 toward image generator 60.

Image generator 60 includes elements such as a digital micromirror device and a liquid crystal panel. Under the control of controller 80, image generator 60 spatially modulates the light incident from light guide optical system 50 according to an image signal that is input from an external device, and sends the spatially modulated light to projection optical system 70.

Projection optical system 70 includes optical members such as a lens and a mirror, and magnifies the light incident from image generator 60, thus projecting the light onto a screen or the like (not shown).

Controller 80 controls operations of light source 20 and image generator 60.

Figure 2:
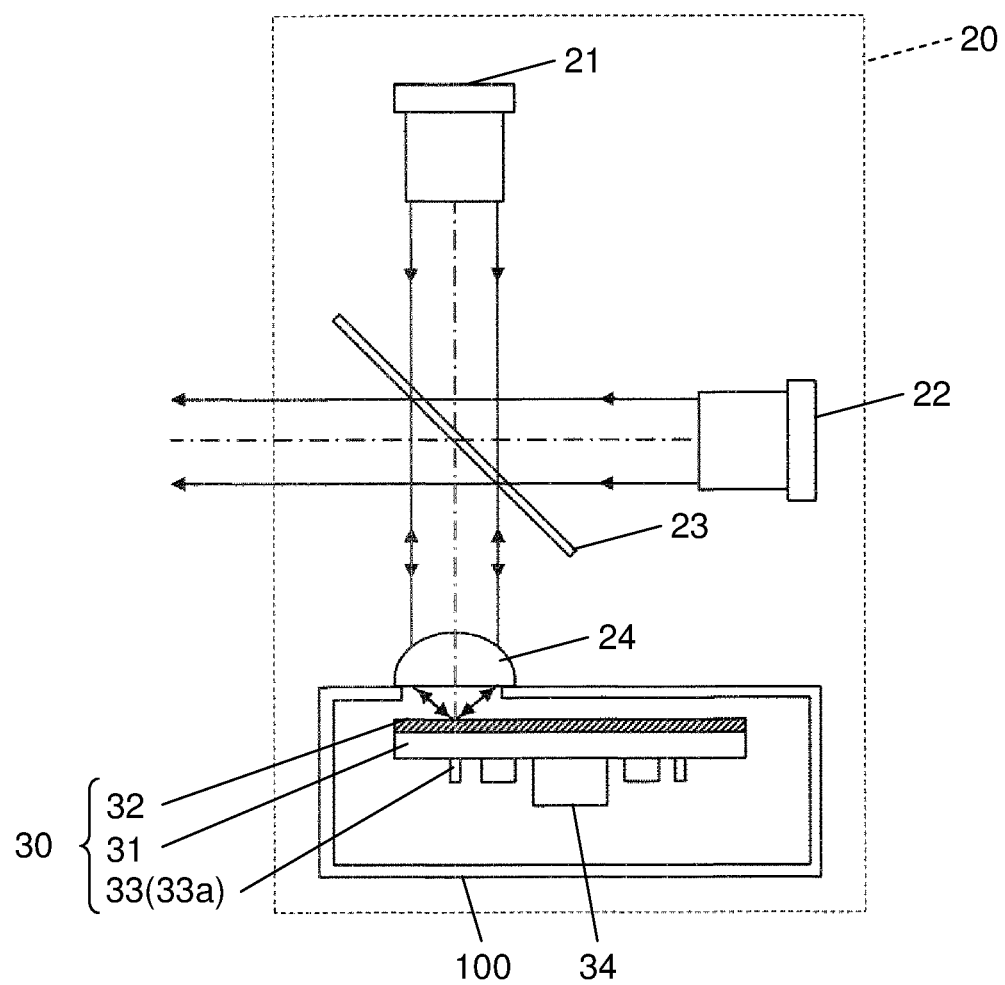
FIG. 2 is a schematic view for describing a configuration of a light source of the projection-type image display apparatus in Embodiment 1.

FIG. 2 is a schematic view for describing a configuration of light source 20 of projection-type image display apparatus 10 in Embodiment 1. Light source 20 includes blue semiconductor lasers 21 and 22, dichroic mirror 23, condenser lens 24, phosphor wheel 30, motor 34, and phosphor wheel cooling device 100.

Blue light emitted by blue semiconductor laser 21 passes through dichroic mirror 23, and is focused by condenser lens 24 onto phosphor wheel 30. Then, phosphor 32 provided on phosphor wheel 30 is irradiated with the focused blue light. Here, phosphor wheel 30 is rotationally driven about a rotation shaft by motor 34. The blue light with which phosphor 32 is irradiated excites phosphor 32. Excited phosphor 32 emits yellow light toward condenser lens 24. The yellow light emitted by phosphor 32 passes through condenser lens 24, and is reflected by dichroic mirror 23. The reflected yellow light is synthesized with blue light that has been emitted by blue semiconductor laser 22 and passed through dichroic mirror 23, turns into white light, and is emitted toward light guide optical system 50.

Figure 3A:
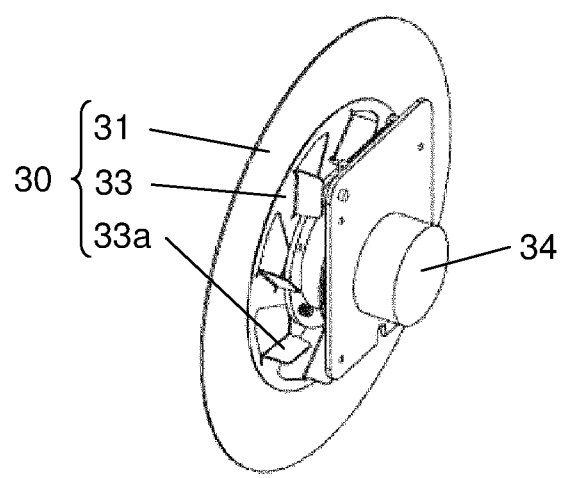
FIG. 3A is a perspective view illustrating a phosphor wheel in Embodiment 1.
Figure 3B:
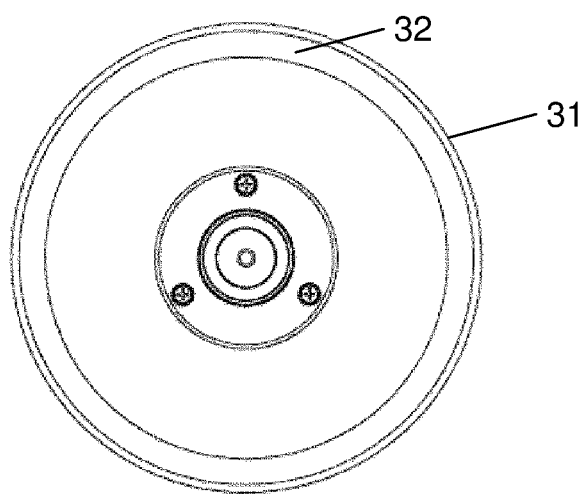
FIG. 3B is a front view illustrating the phosphor wheel in Embodiment 1.

FIG. 3A is a perspective view illustrating phosphor wheel 30 in Embodiment 1. FIG. 3B is a front view illustrating phosphor wheel 30 in Embodiment 1. Phosphor wheel 30 includes disc-shaped metal substrate 31, phosphor 32, and wheel blade 33.

Metal substrate 31 has a disc shape, and is formed of a metallic material.

In a vicinity of an outer circumferential portion of one of major surfaces (the other surface) of metal substrate 31, phosphor 32 is formed in a ring shape. Phosphor 32 is applied as a layer onto metal substrate 31 by, for example, screen printing.

Wheel blade 33 is fixed to a surface (one surface) of metal substrate 31 opposite to the surface provided with phosphor 32. Wheel blade 33 includes a plurality of blade portions 33a (blade members). The plurality of blade portions 33a rise substantially perpendicularly to metal substrate 31. Blade portions 33a are formed by, for example, bending a stainless steel plate. Wheel blade 33 is disposed more inwardly than phosphor 32 in a radial direction of metal substrate 31.

Motor 34 rotates phosphor wheel 30 about the rotation shaft.

With this configuration, motor 34 is driven to rotate phosphor wheel 30 including wheel blade 33, resulting in a current of air (air flow) heading outward along a radial direction of metal substrate 31.

Figure 4:
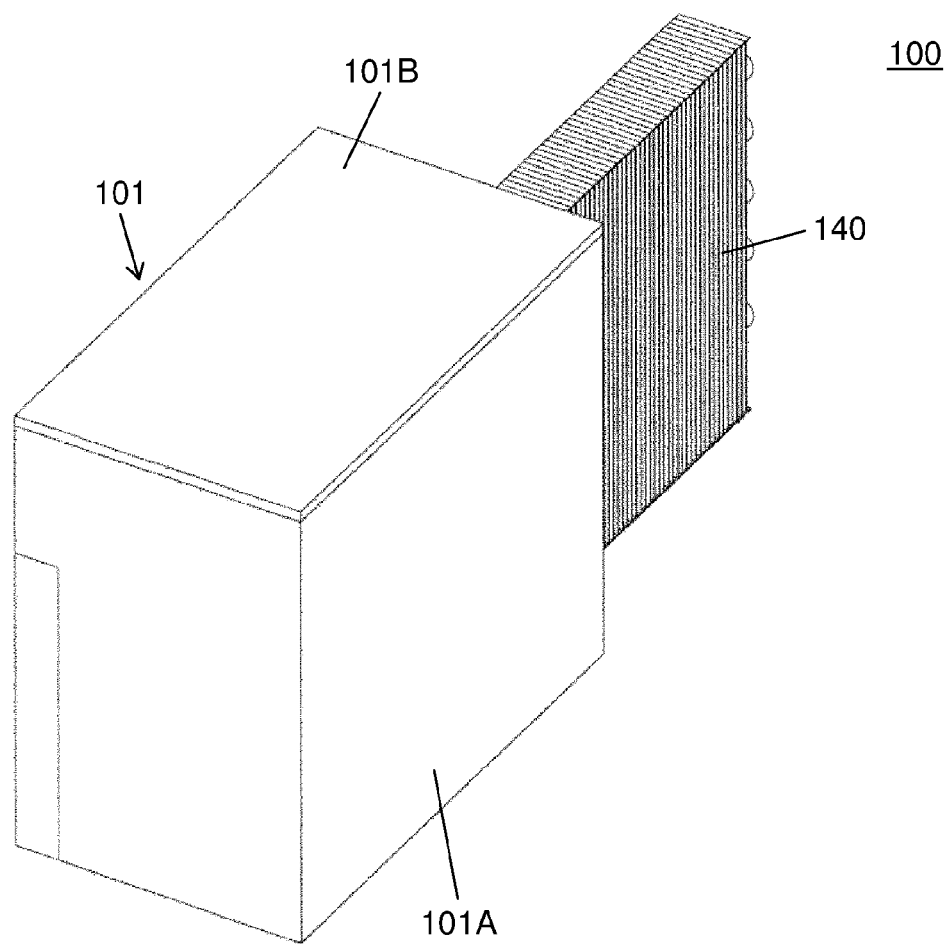
FIG. 4 is a perspective view illustrating a phosphor wheel cooling device in Embodiment 1.
Figure 5:
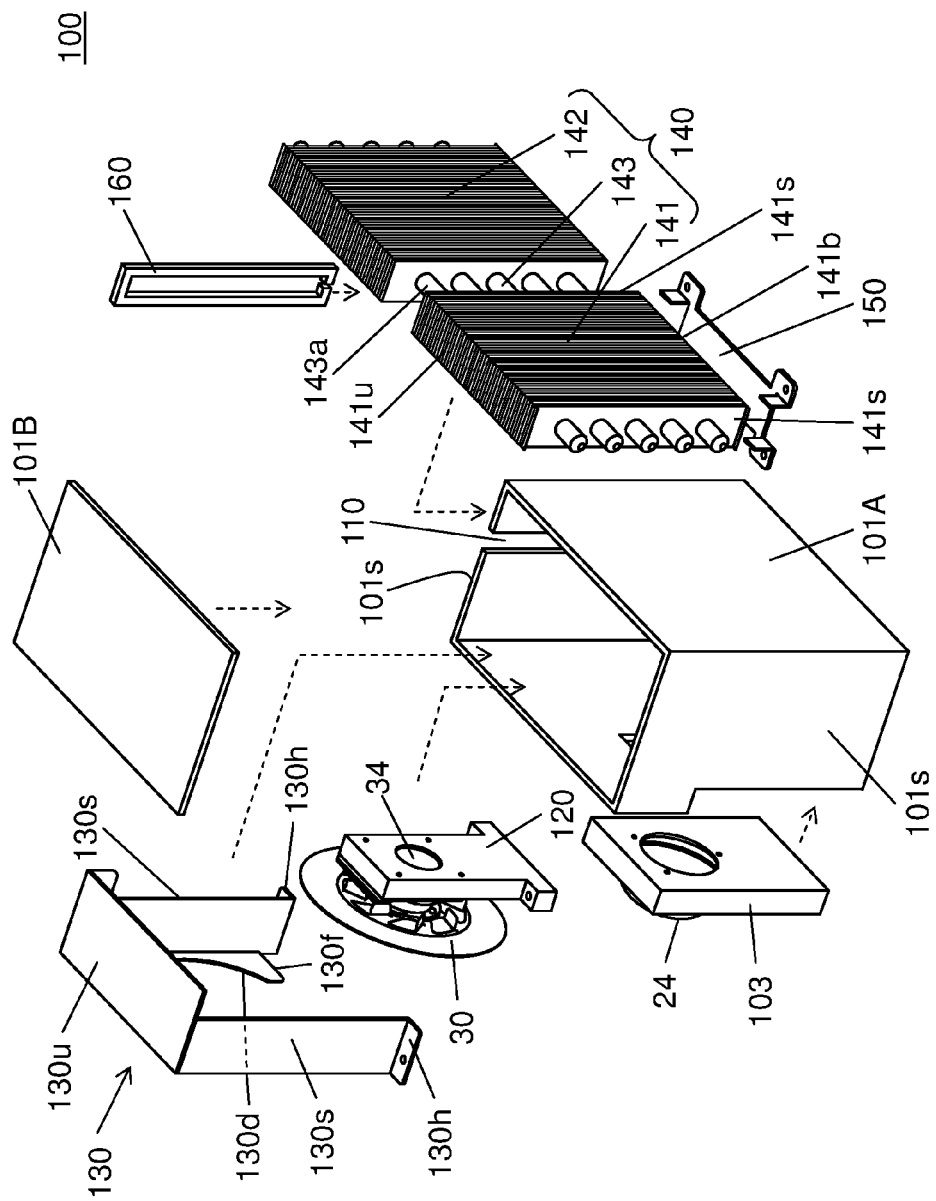
FIG. 5 is an exploded perspective view illustrating the phosphor wheel cooling device in Embodiment 1.
Figure 6:
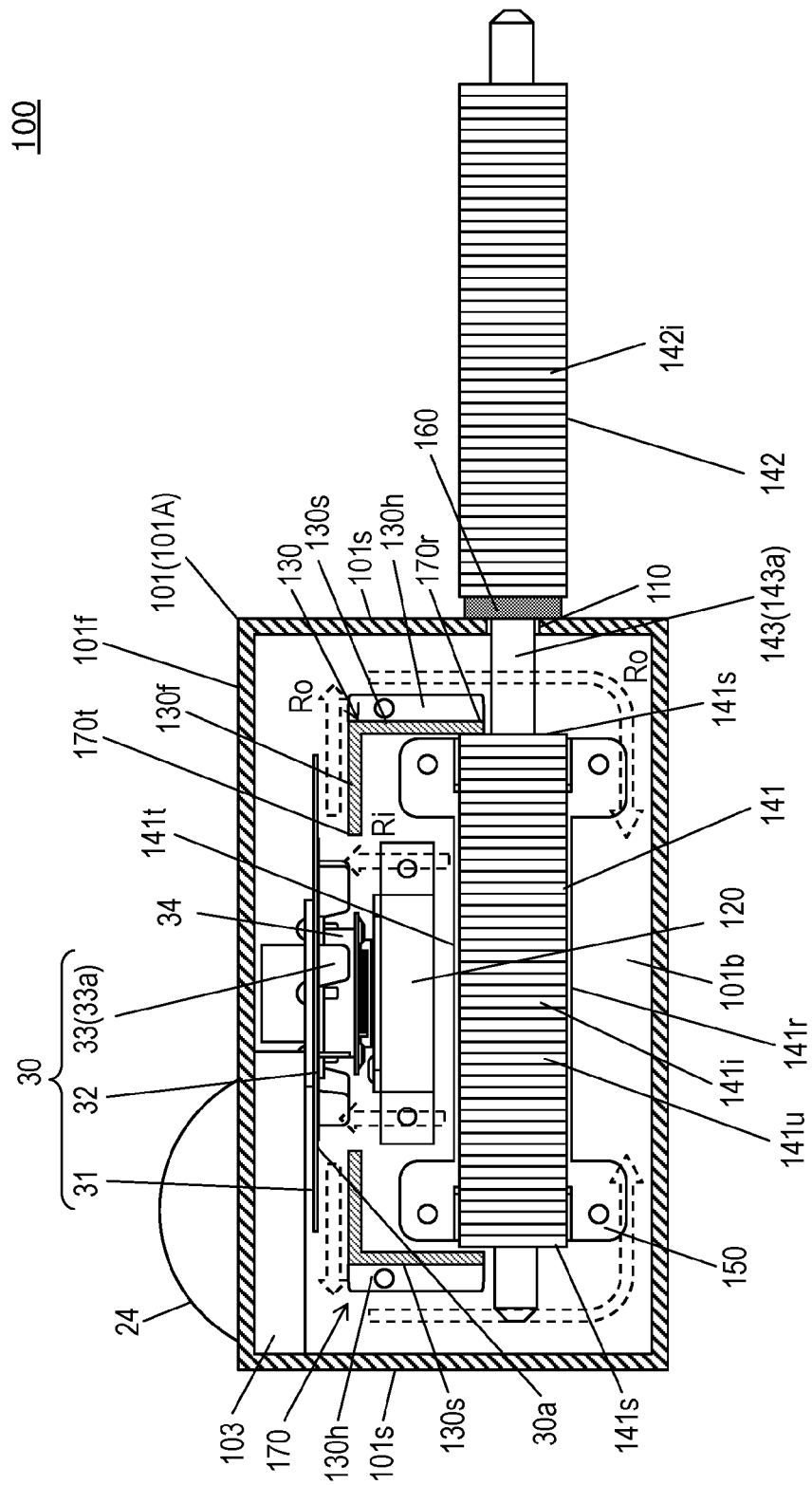
FIG. 6 is a sectional view illustrating the phosphor wheel cooling device in Embodiment 1.

Referring to FIG. 4, FIG. 5, and FIG. 6, phosphor wheel cooling device 100 will be detailed. In order to facilitate understanding, the following description will be based on vertical and horizontal directions in perspective views of FIG. 4 and FIG. 5 for convenience sake. However, it should be noted that these directions by no means limit arrangements in use or structure of phosphor wheel cooling device 100.

FIG. 4 is a perspective view illustrating phosphor wheel cooling device 100 in Embodiment 1. Phosphor wheel cooling device 100 includes phosphor wheel 30 (see FIG. 5), enclosure main body 101A, enclosure lid 101B, and heat exchanger unit 140. Phosphor wheel cooling device 100 hermetically encloses phosphor wheel 30 so as to avoid entry of dust into enclosure 101. This makes it possible to prevent the dust from adhering to phosphor 32, being irradiated with blue light and burning in phosphor 32. A part of heat exchanger unit 140 is exposed to an outside of enclosure 101.

FIG. 5 is an exploded perspective view illustrating phosphor wheel cooling device 100 in Embodiment 1. Phosphor wheel cooling device 100 includes not only phosphor wheel 30, enclosure main body 101A, enclosure lid 101B, and heat exchanger unit 140, which have been described above, but also condenser lens 24, lens holding member 103, motor 34, motor holding member 120, gas flow defining plate 130, heat exchanger unit holding member 150, and dustproof sponge 160.

Enclosure main body 101A has a box shape having a predetermined plane that is open. In right lateral surface portion 101s of enclosure main body 101A, slit 110 is provided for exposing the part of heat exchanger unit 140 to the outside.

Heat exchanger unit 140 includes heat-receiving fin group 141, heat-dissipating fin group 142, and heat transport heat pipe group 143. Heat transport heat pipe group 143 includes a plurality of heat pipes 143a. Heat-dissipating fin group 142 and a part of heat transport heat pipe group 143 are exposed to the outside of enclosure 101 through slit 110 and dustproof sponge 160.

FIG. 6 is a sectional view illustrating phosphor wheel cooling device 100 in Embodiment 1. FIG. 6 shows a horizontal cross section taken at a height of uppermost heat pipe 143a among the heat pipes in heat transport heat pipe group 143 (see FIG. 5). Furthermore, only enclosure main body 101A, gas flow defining plate 130, and dustproof sponge 160 are shown in cross section.

Condenser lens 24 is fixed to front surface portion 101f of enclosure main body 101A using lens holding member 103.

Phosphor wheel 30 is attached to motor holding member 120 via motor 34. Motor holding member 120 is fixed to bottom surface portion 101b of enclosure main body 101A.

Heat exchanger unit 140 is fixed to bottom surface portion 101b of enclosure main body 101A using heat exchanger unit holding member 150.

Heat-receiving fin group 141 includes a plurality of fins 141i. The plurality of fins 141i are arranged at predetermined spacings along a longitudinal direction of heat exchanger unit 140 (the horizontal direction of FIG. 6). The air (current of air) can flow through spaces between fins 141i in a direction orthogonal to the longitudinal direction of heat exchanger unit 140 (the vertical direction of FIG. 6). Furthermore, heat-receiving fin group 141 is fixed to bottom surface portion 101b of enclosure main body 101A using heat exchanger unit holding member 150.

Heat-dissipating fin group 142 includes a plurality of fins 142i. The plurality of fins 142i are arranged at predetermined spacings along the longitudinal direction of heat exchanger unit 140.

Heat transport heat pipe group 143 includes a plurality of heat pipes 143a. Heat transport heat pipe group 143 thermally connects heat-receiving fin group 141 and heat-dissipating fin group 142. Herein, thermally connecting heat-receiving fin group 141 and heat-dissipating fin group 142 means that heat transport heat pipe group 143 has a function of not only connecting heat-receiving fin group 141 and heat-dissipating fin group 142 but also transmitting heat from heat-receiving fin group 141 to heat-dissipating fin group 142. The heat generated in phosphor wheel 30 is transmitted via the air circulating inside enclosure 101 to heat-receiving fin group 141. The heat received by heat-receiving fin group 141 is transmitted via heat transport heat pipe group 143 to heat-dissipating fin group 142 and dissipated from heat-dissipating fin group 142 toward an external space.

Dustproof sponge 160 is disposed between heat-dissipating fin group 142 exposed to the outside of enclosure 101 and lateral surface portion 101s of enclosure main body 101A, and fills a clearance between heat-dissipating fin group 142 and lateral surface portion 101s. This suppresses the entry of dust through slit 110 into enclosure 101.

As illustrated in FIG. 5, gas flow defining plate 130 includes front surface portion 130f, upper surface portion 130u, and a pair of right and left lateral surface portions 130s, and has a substantially gate shape. Flanges 130h are provided in lower end portions of the pair of right and left lateral surface portions 130s. Gas flow defining plate 130 is fixed to bottom surface portion 101b of enclosure main body 101A via flanges 130h. Front surface portion 130f has circular arc cutout 130d with a smaller diameter than phosphor wheel 30.

Here, gas flow defining plate 130 and enclosure main body 101A form gas flow definer 170. Gas flow definer 170 separates flow path Ri and flow path Ro. Flow path Ri is a path along which the air that has been cooled by heat-receiving fin group 141 flows before being blown to wheel blade disposed surface 30a (a surface of phosphor wheel 30 on which wheel blade 33 is disposed). Flow path Ro is a path along which the air that has been blown to wheel blade disposed surface 30a (one surface) and heated flows.

The following is a description of a configuration of gas flow definer 170.

Gas flow definer 170 has an opening on its side toward phosphor wheel 30. The opening is defined by front surface portion 130f and upper surface portion 130u of gas flow defining plate 130, and bottom surface portion 101b of enclosure main body 101A. Furthermore, gas flow definer 170 has an opening on its side toward heat-receiving fin group 141. The opening is defined by upper surface portion 130u and the pair of lateral surface portions 130s of gas flow defining plate 130, and bottom surface portion 101b and a pair of lateral surface portions 101s of enclosure main body 101A. In other words, gas flow definer 170 is formed in a duct shape with the respective openings on the side toward phosphor wheel 30 and the side toward heat-receiving fin group 141.

Here, end portions of lateral surface portions 130s toward heat-receiving fin group 141 (gas-receiving ends 170r of gas flow definer 170) respectively overlap right and left lateral portions 141s of heat-receiving fin group 141 in such a manner as to be close to or in contact with right and left lateral portions 141s. Furthermore, an end portion of upper surface portion 130u toward heat-receiving fin group 141 overlaps upper portion 141u of heat-receiving fin group 141 in such a manner as to be close to or in contact with upper portion 141u. Moreover, heat-receiving fin group 141 is fixed to bottom surface portion 101b via heat exchanger unit holding member 150 such that lower portion 141b of heat-receiving fin group 141 is close to bottom surface portion 101b of enclosure main body 101A. Accordingly, heat-receiving fin group 141 is surrounded by gas flow defining plate 130 and bottom surface portion 101b of enclosure main body 101A at least on a side toward gas-sending end 141t.

Front surface portion 130f is close to and faces an outer circumferential portion of wheel blade disposed surface 30a via a predetermined length of clearance. Herein, the predetermined length is approximately equal to a vertical height of blade portion 33a with respect to wheel blade disposed surface 30a. In other words, front surface portion 130f (gas-sending end 170t of gas flow definer 170) is close to and faces the outer circumferential portion of wheel blade disposed surface 30a.

With the above configuration, the air that has been cooled by heat-receiving fin group 141 and come out from gas-sending end 141t passes through a surrounding area of motor 34 and is blown to wheel blade disposed surface 30a. By the rotation of wheel blade 33, the blown air turns radially outward and flows along wheel blade disposed surface 30a radially outward. This makes it possible to appropriately cool down the vicinity of an outer circumference of metal substrate 31 where phosphor 32 is formed and whose temperature has risen particularly due to the irradiation with the blue light.

In particular, since Embodiment 1 provides duct-shaped gas flow definer 170, the air that has been heated while flowing radially outward along wheel blade disposed surface 30a flows reliably toward gas-receiving end 141r of heat-receiving fin group 141. Then, the air that has reached gas-receiving end 141r is deprived of heat and cooled down by heat-receiving fin group 141 when flowing through heat-receiving fin group 141 from gas-receiving end 141r toward gas-sending end 141t. Subsequently, the cooled air passes through gas flow definer 170 and the surrounding area of motor 34, and is blown to wheel blade disposed surface 30a. The blown air circulates in gas flow definer 170 as described above. In this manner, while having a hermetic structure for blocking the entry of dust, phosphor wheel cooling device 100 can appropriately cool down phosphor wheel 30 and motor 34 that are hermetically enclosed in enclosure 101.

Figure 7:
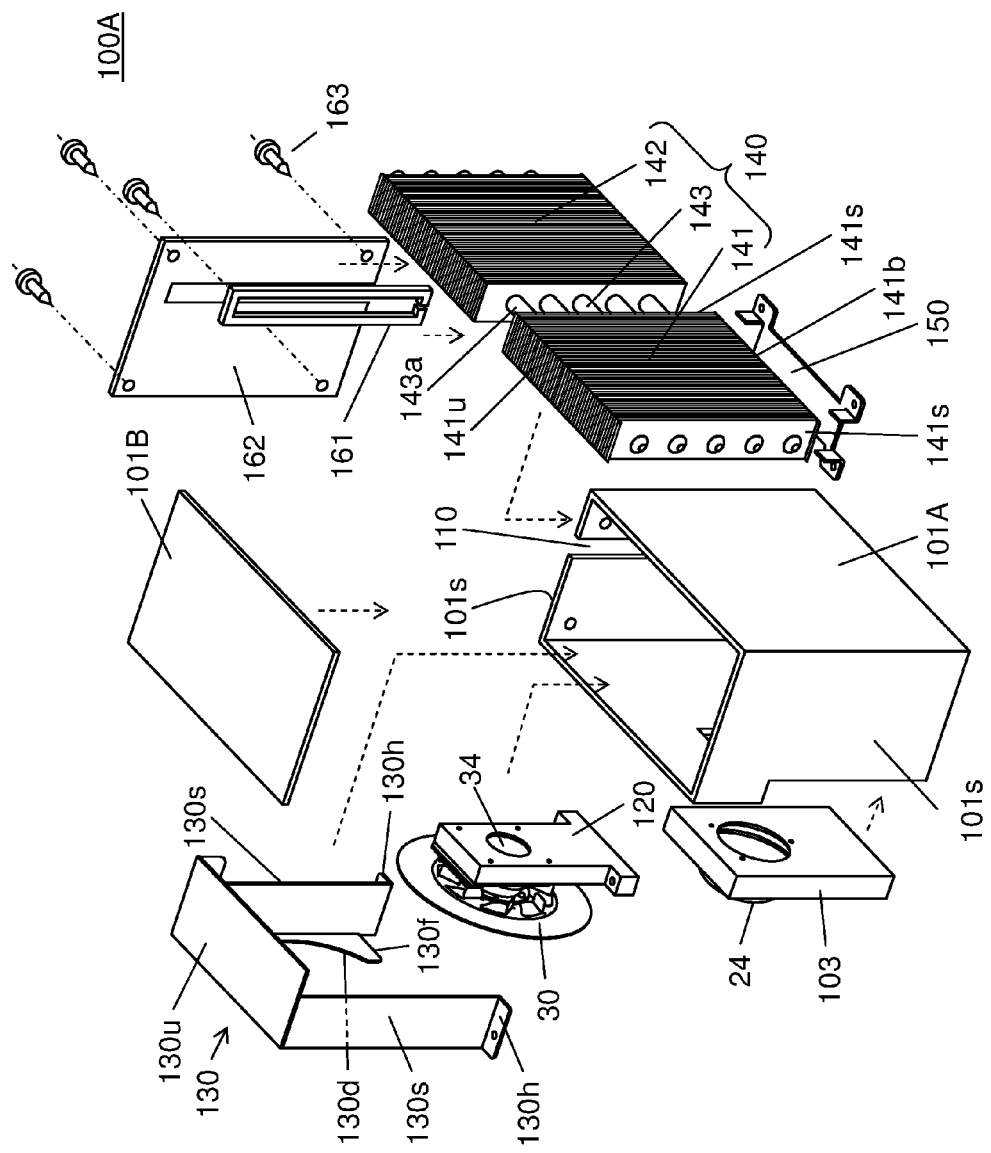
FIG. 7 is an exploded perspective view illustrating a phosphor wheel cooling device in a variation of Embodiment 1.
Figure 8:
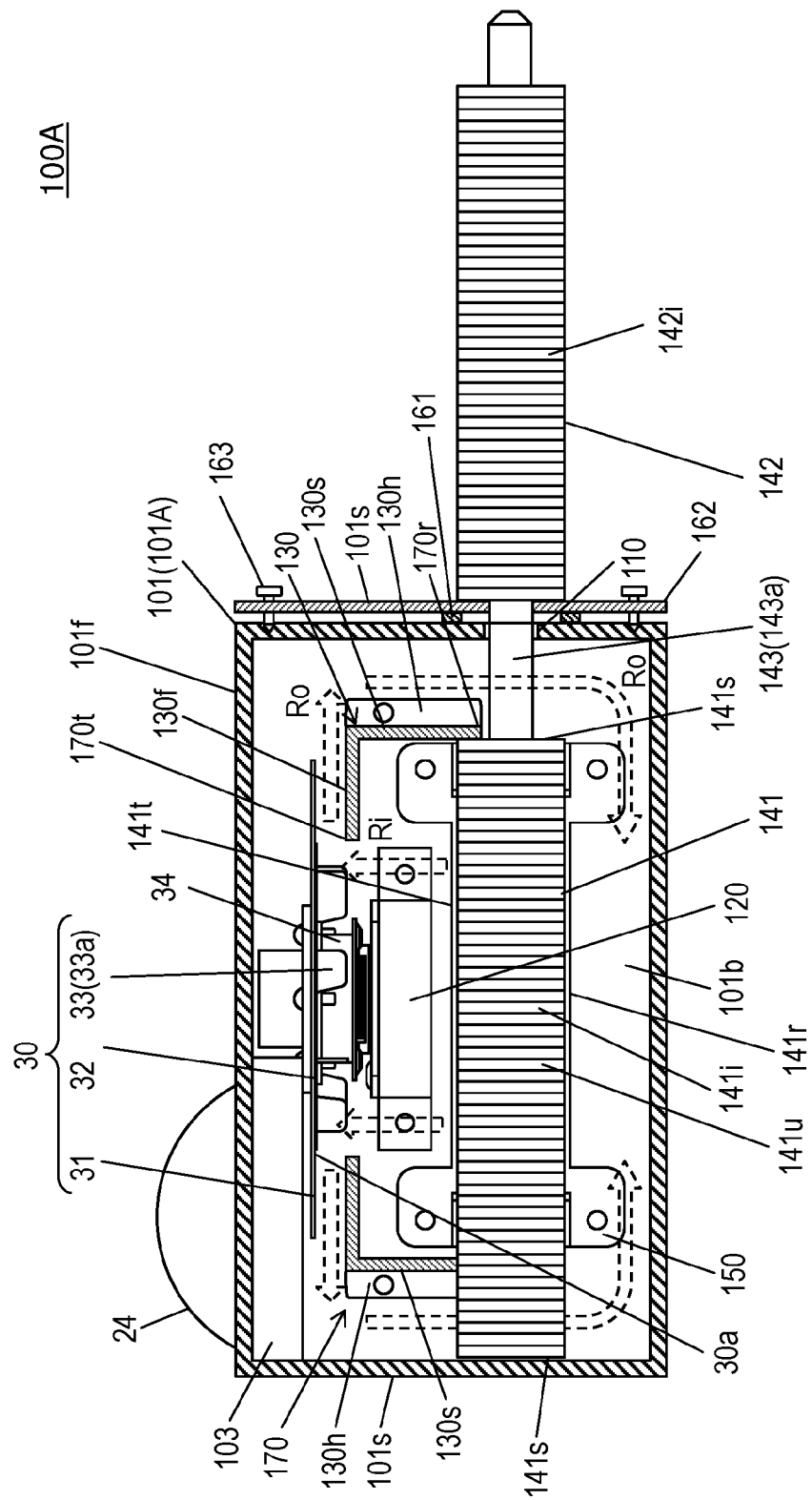
FIG. 8 is a sectional view illustrating the phosphor wheel cooling device in the variation of Embodiment 1.

FIG. 7 is an exploded perspective view illustrating phosphor wheel cooling device 100A in a variation of Embodiment 1. FIG. 8 is a sectional view illustrating phosphor wheel cooling device 100A in the variation of Embodiment 1. Similarly to FIG. 6, FIG. 8 shows a horizontal cross section taken at a height of uppermost heat pipe 143a among the heat pipes in heat transport heat pipe group 143. A redundant description of the same structural elements as those in phosphor wheel cooling device 100 in Embodiment 1 will be omitted. The following description will be directed only to what is different from Embodiment 1.

The configuration of phosphor wheel cooling device 100A is different from that of phosphor wheel cooling device 100 in two aspects below.

First, as illustrated in FIG. 7, dustproof sponge 160 is replaced by sealing material 161 and aluminum plate 162. Aluminum plate 162 is attached to heat transport heat pipe group 143 by, for example, soldering so as to be made into one piece with heat exchanger unit 140. Aluminum plate 162 is fixed to lateral surface portion 101s of enclosure main body 101A by screws 163. This not only facilitates assembly of enclosure 101 but also allows sealing material 161 and aluminum plate 162 to prevent the entry of dust. In other words, it is possible to enhance the assembly and airtightness of enclosure 101. Second, as illustrated in FIG. 8, heat-receiving fin group 141 is extended to lateral surface portion 101s of enclosure main body 101A. This increases a surface area of heat-receiving fin group 141 through which the heated air passes. That is to say, a cooling performance of heat exchanger unit 140 improves.

Embodiment 2

In the following, non-limiting Embodiment 2 will be described, with reference to FIG. 9, FIG. 10, and FIG. 11. It should be noted that a basic configuration of a projection-type image display apparatus is similar to that described with reference to FIG. 1, FIG. 2, FIG. 3A, and FIG. 3B in Embodiment 1 and will not be described again here.

Figure 9:
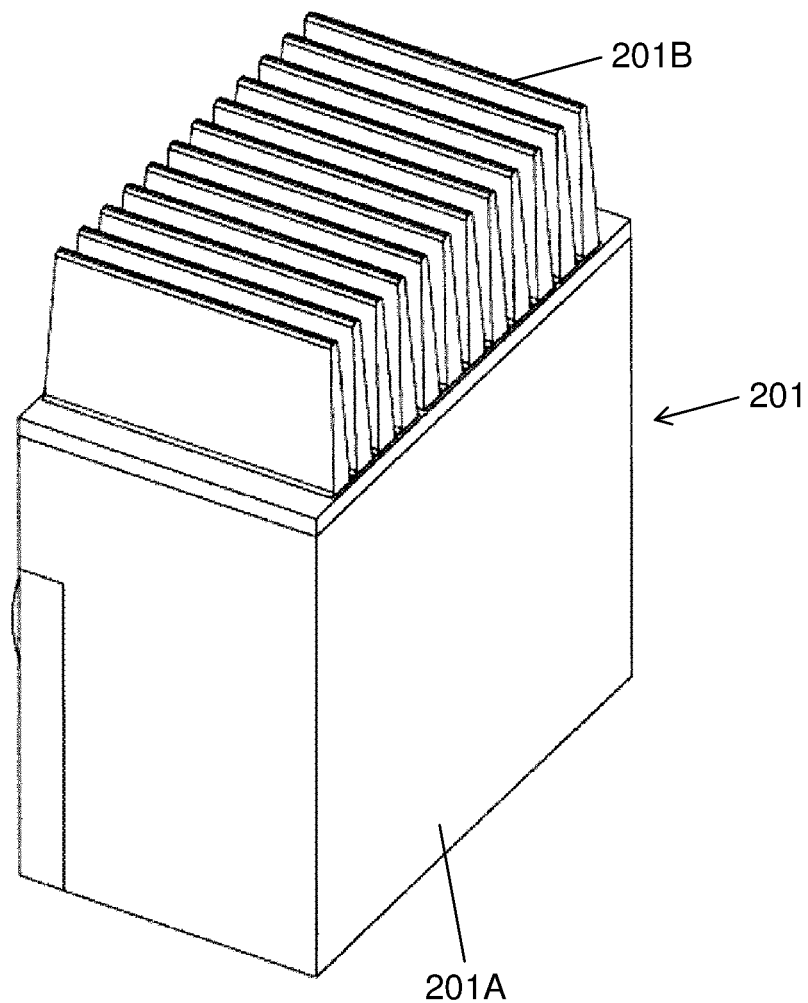
FIG. 9 is a perspective view illustrating a phosphor wheel cooling device in Embodiment 2.

FIG. 9 is a perspective view illustrating phosphor wheel cooling device 200 in Embodiment 2. Phosphor wheel cooling device 200 includes phosphor wheel 30 (see FIG. 10), enclosure main body 201A, and heat exchanger unit-integrated lid 201B. Phosphor wheel cooling device 200 hermetically encloses phosphor wheel 30 so as to avoid entry of dust into enclosure 201. This makes it possible to prevent the dust from adhering to phosphor 32, being irradiated with blue light and burning in phosphor 32.

Figure 10:
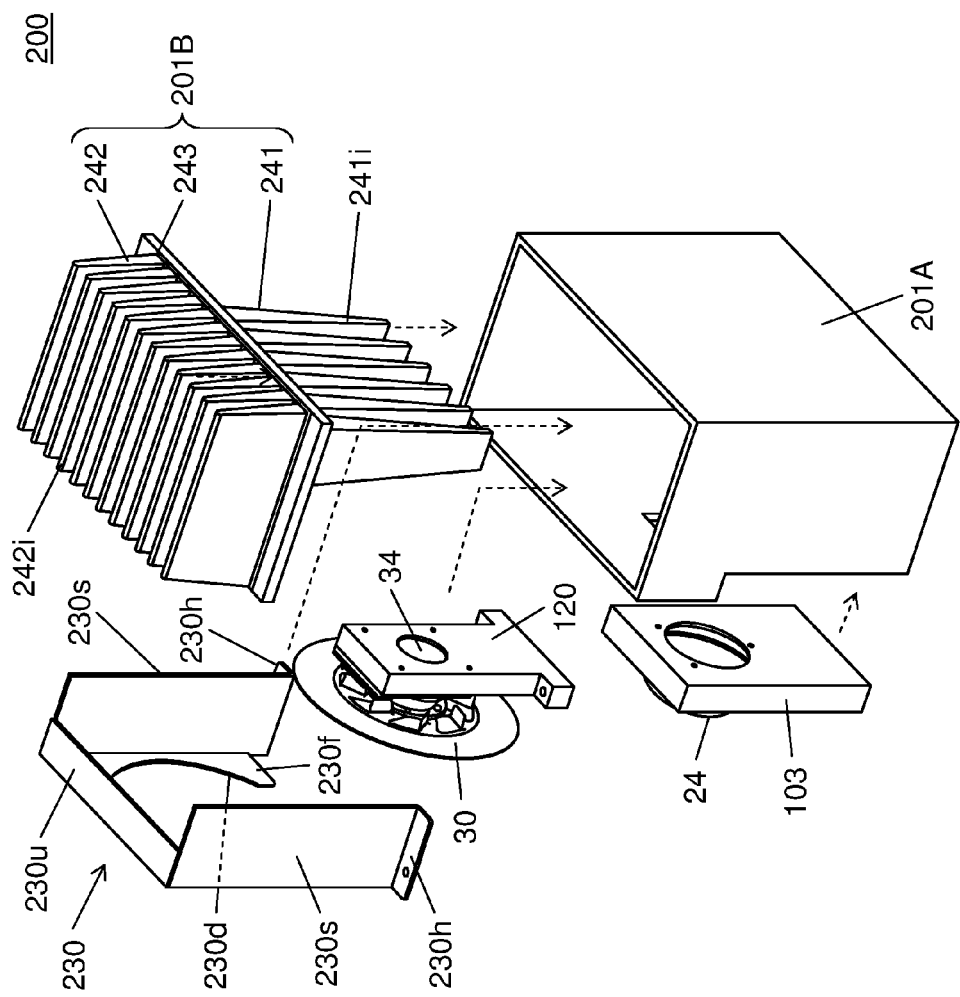
FIG. 10 is an exploded perspective view illustrating the phosphor wheel cooling device in Embodiment 2.

FIG. 10 is an exploded perspective view illustrating phosphor wheel cooling device 200 in Embodiment 2. Phosphor wheel cooling device 200 includes not only phosphor wheel 30, enclosure main body 201A, and heat exchanger unit-integrated lid 201B, which have been described above, but also condenser lens 24, lens holding member 103, motor holding member 120, and gas flow defining plate 230.

Heat exchanger unit-integrated lid 201B includes heat-receiving fin group 241, heat-dissipating fin group 242, and lid portion 243 that are formed into an integral piece. Heat-dissipating fin group 242 and a part of lid portion 243 are exposed to an outside of enclosure 201.

Figure 11:
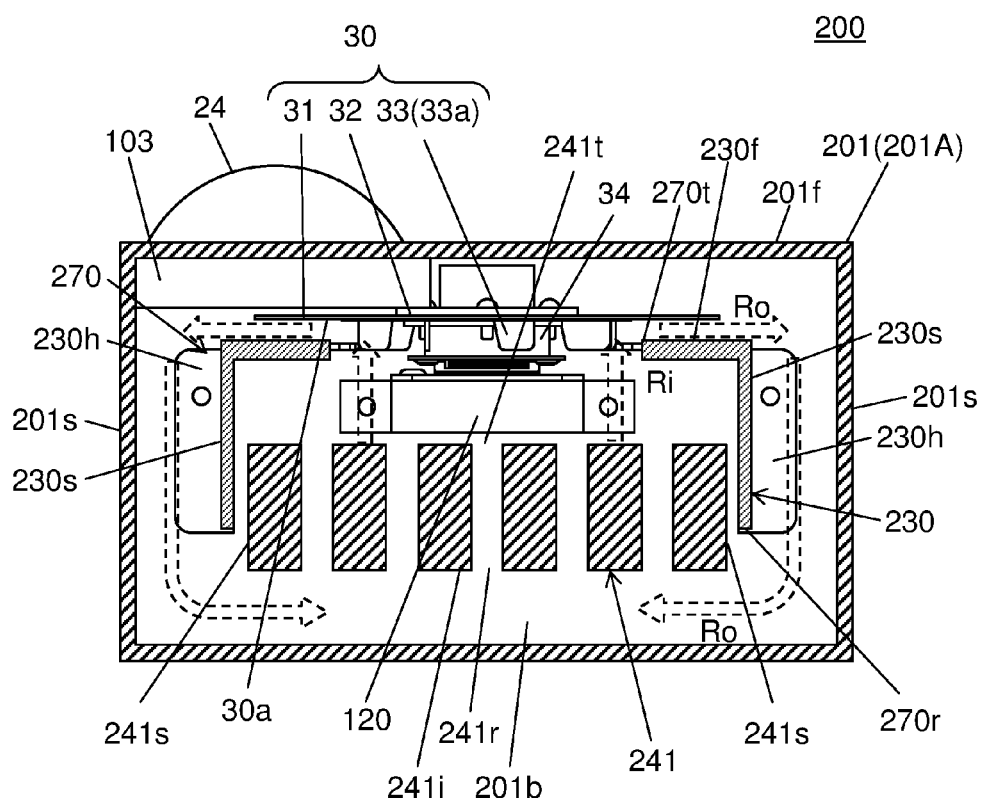
FIG. 11 is a sectional view illustrating the phosphor wheel cooling device in Embodiment 2.

FIG. 11 is a sectional view illustrating phosphor wheel cooling device 200 in Embodiment 2. FIG. 11 shows a horizontal cross section taken at a height near a position immediately below upper surface portion 230u of gas flow defining plate 230 (see FIG. 10). Furthermore, only enclosure main body 201A, heat-receiving fin group 241, and gas flow defining plate 230 are shown in cross section.

Condenser lens 24 is fixed to front surface portion 201f of enclosure main body 201A using lens holding member 103.

Similarly to Embodiment 1, phosphor wheel 30 is attached to motor holding member 120 via motor 34. Motor holding member 120 is fixed to bottom surface portion 201b of enclosure main body 201A.

Heat-receiving fin group 241 includes a plurality of fins 241i. The plurality of fins 241i are arranged at predetermined spacings along a longitudinal direction of heat exchanger unit-integrated lid 201B (the horizontal direction of FIG. 11). The air can flow through spaces between fins 241i in a direction orthogonal to the longitudinal direction of heat exchanger unit-integrated lid 201B (the vertical direction of FIG. 11).

Heat-dissipating fin group 242 includes a plurality of fins 242i. The plurality of fins 242i are arranged at predetermined spacings along the longitudinal direction of heat exchanger unit-integrated lid 201B (the horizontal direction of FIG. 11).

Lid portion 243 thermally connects heat-receiving fin group 241 and heat-dissipating fin group 242. Herein, thermally connecting heat-receiving fin group 241 and heat-dissipating fin group 242 means that lid portion 243 has a function of not only connecting heat-receiving fin group 241 and heat-dissipating fin group 242 but also transmitting heat from heat-receiving fin group 241 to heat-dissipating fin group 242. The heat generated in phosphor wheel 30 is transmitted via the air circulating inside enclosure 201 to heat-receiving fin group 241. The heat received by heat-receiving fin group 241 is transmitted via lid portion 243 to heat-dissipating fin group 242 and dissipated from heat-dissipating fin group 242 toward an external space.

As illustrated in FIG. 10, gas flow defining plate 230 includes front surface portion 230f, upper surface portion 230u, and a pair of right and left lateral surface portions 230s, and has a substantially gate shape. Flanges 230h are provided in lower end portions of the pair of right and left lateral surface portions 230s. Gas flow defining plate 230 is fixed to bottom surface portion 201b of enclosure main body 201A via flanges 230h. Front surface portion 230f has circular arc cutout 230d with a smaller diameter than phosphor wheel 30.

Here, gas flow defining plate 230 and enclosure main body 201A form gas flow definer 270. Gas flow definer 270 separates flow path Ri and flow path Ro. Flow path Ri is a path along which the air that has been cooled by heat-receiving fin group 241 flows before being blown to wheel blade disposed surface 30a. Flow path Ro is a path along which the air that has been blown to wheel blade disposed surface 30a and heated flows.

The following is a description of a configuration of gas flow definer 270.

Gas flow definer 270 has an opening on its side toward phosphor wheel 30. The opening is defined by front surface portion 230f and upper surface portion 230u of gas flow defining plate 230, and bottom surface portion 201b of enclosure main body 201A. Furthermore, gas flow definer 270 has an opening on its side toward heat-receiving fin group 241. The opening is defined by upper surface portion 230u and the pair of lateral surface portions 230s of gas flow defining plate 230, and bottom surface portion 201b and a pair of lateral surface portions 201s of enclosure main body 201A. In other words, gas flow definer 270 is formed to have a duct shape with the respective openings on the side toward phosphor wheel 30 and the side toward heat-receiving fin group 241.

Here, end portions of lateral surface portions 230s toward heat-receiving fin group 241 (gas-receiving ends 270r of gas flow definer 270) respectively overlap right and left lateral portions 241s of heat-receiving fin group 241 in such a manner as to be close to right and left lateral portions 241s. Furthermore, an end portion of upper surface portion 230u toward heat-receiving fin group 241 is close to heat-receiving fin group 241. Accordingly, heat-receiving fin group 241 is surrounded by gas flow defining plate 230 and bottom surface portion 201b of enclosure main body 201A at least on a side toward gas-sending end 241t.

Front surface portion 230f of gas flow defining plate 230 is close to and faces an outer circumferential portion of wheel blade disposed surface 30a via a predetermined length of clearance. Herein, the predetermined length is approximately equal to a vertical height of blade portion 33a with respect to wheel blade disposed surface 30a. In other words, front surface portion 230f (gas-sending end 270t of gas flow definer 270) is close to and faces the outer circumferential portion of wheel blade disposed surface 30a.

With the above configuration, the air that has been cooled by heat-receiving fin group 241 and come out from gas-sending end 241t passes through a surrounding area of motor 34 and is blown to wheel blade disposed surface 30a. By the rotation of wheel blade 33, the blown air turns radially outward and flows along wheel blade disposed surface 30a radially outward. This makes it possible to appropriately cool down also the vicinity of an outer circumference of metal substrate 31 where phosphor 32 is formed and whose temperature has risen particularly due to the irradiation with the blue light.

In particular, since Embodiment 2 provides duct-shaped gas flow definer 270, the air that has been heated while flowing radially outward along wheel blade disposed surface 30a flows reliably toward gas-receiving end 241r of heat-receiving fin group 241. Then, the air that has reached gas-receiving end 241r is deprived of heat and cooled down by heat-receiving fin group 241 when flowing through heat-receiving fin group 241 from gas-receiving end 241r toward gas-sending end 241t. Subsequently, the cooled air passes through gas flow definer 270 and the surrounding area of motor 34, and is blown to wheel blade disposed surface 30a. The blown air circulates in gas flow definer 270 as described above. In this manner, while having a hermetic structure for blocking the entry of dust, phosphor wheel cooling device 200 can appropriately cool down phosphor wheel 30 and motor 34 that are hermetically enclosed in enclosure 201.

Additionally, while having the hermetic structure for preventing the entry of dust, Embodiment 2 can dissipate the heat inside enclosure 201 through heat exchanger unit-integrated lid 201B. Lid portion 243 constituting heat exchanger unit-integrated lid 201B functions as enclosure lid 101B and heat transport heat pipe group 143 in Embodiment 1. Thus, phosphor wheel cooling device 200 includes a smaller number of parts than phosphor wheel cooling device 100, making it possible to achieve a cost reduction.
(Advantageous Effects, Etc.)

Here, advantageous effects, etc. of Embodiments 1 and 2 will be discussed.

Phosphor wheel cooling devices 100 and 200 (cooling devices) in Embodiments 1 and 2 each cool down disc-shaped phosphor wheel 30 (a wheel) that is hermetically enclosed in enclosure 101, 201 and rotationally driven about a rotation shaft.

Phosphor wheel cooling device 100, 200 includes a plurality of blade portions 33a (blade members) that are disposed on wheel blade disposed surface 30a (one surface) of phosphor wheel 30, heat exchanger unit 140 or heat exchanger unit-integrated lid 201B (a heat dissipater) to which the air (a gas) heated by phosphor wheel 30 is blown by blade portions 33a due to rotation of phosphor wheel 30, and gas flow definer 170, 270 that is located inside enclosure 101, 201 and separates flow path Ri and flow path Ro. Flow path Ri is a path along which the air that has been cooled by heat exchanger unit 140 or heat exchanger unit-integrated lid 201B flows before being blown to wheel blade disposed surface 30a. Flow path Ro is a path along which the air that has been blown to wheel blade disposed surface 30a and heated flows.

This makes it possible to appropriately cool down disc-shaped phosphor wheel 30 that is hermetically enclosed in enclosure 101, 201 and rotationally driven about the rotation shaft.

In Embodiment 1, heat exchanger unit 140 includes heat-receiving fin group 141 (a heat-receiving fin) that is disposed inside enclosure 101, heat-dissipating fin group 142 (a heat-dissipating fin) that is disposed outside enclosure 101, and heat transport heat pipe group 143 (a heat transport member) that has a function of connecting heat-receiving fin group 141 and heat-dissipating fin group 142 and transmitting heat from heat-receiving fin group 141 to heat-dissipating fin group 142.

In Embodiment 2, heat exchanger unit-integrated lid 201B includes heat-receiving fin group 241 (a heat-receiving fin) that is disposed inside enclosure 201, heat-dissipating fin group 242 (a heat-dissipating fin) that is disposed outside enclosure 201, and lid portion 243 (a heat transport member) that has a function of thermally connecting heat-receiving fin group 241 and heat-dissipating fin group 242 and transmitting heat from heat-receiving fin group 241 to heat-dissipating fin group 242.

In Embodiments 1 and 2, gas flow definer 170, 270 has a duct shape, and gas-sending end 170t, 270t of gas flow definer 170, 270 is close to and faces wheel blade disposed surface 30a of phosphor wheel 30.

Furthermore, gas-receiving ends 170r, 270r of gas flow definer 170, 270 respectively overlap right and left lateral portions 141s, 241s of heat-receiving fin group 141, 241 in such a manner as to be close to or in contact with right and left lateral portions 141s, 241s.

With such a configuration, the air that has been cooled by heat-receiving fin group 141, 241 and come out from gas-sending end 141t, 241t is blown to wheel blade disposed surface 30a of phosphor wheel 30 without being mixed with the air that has not yet been cooled. This makes it possible to more appropriately cool down disc-shaped phosphor wheel 30 that is hermetically enclosed in enclosure 101, 201 and rotationally driven about the rotation shaft.

In Embodiment 1, the heat transport member may be heat transport heat pipe group 143 (a heat pipe).

In Embodiment 2, the heat transport member may be lid portion 243.

This allows efficient heat transmission between heat-receiving fin group 141, 241 and heat-dissipating fin group 142, 242.

In Embodiment 2, enclosure 201 includes enclosure main body 201A having a predetermined plane that is open, and heat exchanger unit-integrated lid 201B (an enclosure lid) that closes the predetermined plane. Heat exchanger unit-integrated lid 201B includes heat-receiving fin group 241 (a heat-receiving fin), heat-dissipating fin group 242 (a heat-dissipating fin), and lid portion 243. Heat exchanger unit-integrated lid 201B (a heat dissipater) includes heat-receiving fin group 241 that is located on an inner surface of lid portion 243 and formed into an integral piece with lid portion 243, heat-dissipating fin group 242 that is located on an outer surface of lid portion 243 and formed into the integral piece with lid portion 243, and a heat transport member, which is lid portion 243, thermally connecting heat-receiving fin group 241 and heat-dissipating fin group 242.

Accordingly, phosphor wheel cooling device 200 in Embodiment 2 includes a smaller number of parts than phosphor wheel cooling device 100 in Embodiment 1, making it possible to achieve a cost reduction.

In Embodiment 2, the integral piece which constitutes heat exchanger unit-integrated lid 201B and is formed by heat-receiving fin group 241, heat-dissipating fin group 242, and lid portion 243 may be a casting.

This makes it possible to produce phosphor wheel cooling device 200 at an even lower cost.

The wheel may be phosphor wheel 30.

This makes it possible to appropriately cool down phosphor wheel 30, which generates a great amount of heat during light irradiation.

The air is an example of a gas. For example, using a helium gas, which has a high thermal conductivity, can be expected to produce a further cooling effect.

Light source 20 includes phosphor wheel cooling device 100, 200 in Embodiment 1, 2, blue semiconductor laser 21 (a laser light source), and condenser lens 24 (a first optical system) that focuses light from blue semiconductor laser 21 onto phosphor 32 of phosphor wheel 30. Projection-type image display apparatus 10 in Embodiments 1 and 2 includes light source 20, image generator 60 (an image display element) that modulates incident light based on an image signal inputted by an external device, light guide optical system 50 (a second optical system) that emits light from light source 20 to image generator 60, and projection optical system 70 (a third optical system) that magnifies and projects light modulated by image generator 60.

In this way, in projection-type image display apparatus 10, it becomes possible to appropriately cool down disc-shaped phosphor wheel 30 that is hermetically enclosed in enclosure 101, 201 and rotationally driven about the rotation shaft.

Embodiment 3

Now, the following is a description of a phosphor wheel cooling device and a projection-type image display apparatus including the phosphor wheel cooling device in Embodiment 3.

Conventionally, with an increase in demand for higher brightness of a projection-type image display apparatus, excitation light tends to be increased, making it even more necessary to cool down a phosphor. Thus, as disclosed in US Patent Application Publication No. 2013/0169938, a cooling performance is enhanced by forming a blade portion on a disc-shaped wheel so as to generate an air flow during rotation of the wheel.

Embodiment 3 provides a phosphor wheel cooling device capable of enhancing reliability and light conversion efficiency and a projection-type image display apparatus including the phosphor wheel cooling device.

In Embodiment 3, the wheel further includes a phosphor on the other surface of the wheel, and the phosphor emits light when being irradiated with excitation light. The enclosure further includes a first wall portion that faces the other surface of the wheel, a second wall portion that faces the one surface of the wheel, and a lateral wall that spaces the first wall portion and the second wall portion away from each other by a predetermined distance. The gas flow definer further includes a portion provided between the second wall portion and the one surface of the wheel so as to partition the enclosure into a space toward the first wall portion and a space toward the second wall portion, a communication portion that connects the space toward the first wall portion and the space toward the second wall portion and is adjacent to the heat dissipater, and an opening that directs the gas bouncing off the heat dissipater, from the space toward the second wall portion to the space toward the first wall portion.

Since the phosphor wheel cooling device in Embodiment 3 cools down the air, whose temperature has been raised due to heat generated by the phosphor wheel, in the heat dissipater and circulates it by convection, it becomes possible to cool down the phosphor wheel efficiently. This raises the light conversion efficiency of the phosphor wheel cooling device, enhances the reliability of the device, and achieves a size reduction of the projection-type image display apparatus including the same.

In the following, non-limiting Embodiment 3 will be described, with reference to FIG. 12 to FIG. 18.

Figure 12:
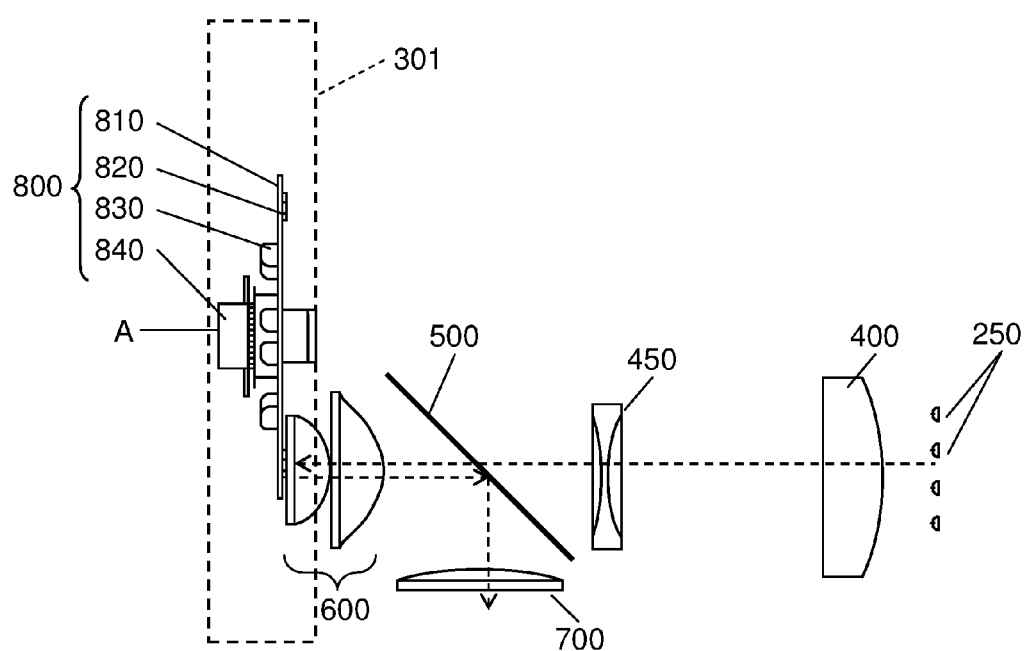
FIG. 12 schematically illustrates a projection-type image display apparatus in Embodiment 3.

FIG. 12 schematically illustrates the projection-type image display apparatus in Embodiment 3. Blue light serving as excitation light is emitted by a plurality of blue semiconductor lasers 250. The blue light passes through lenses 400 and 450, dichroic mirror 500, and two condenser lenses 600, and reaches phosphor 820 provided on the other surface of substrate 810 of phosphor wheel 800. When the blue light is focused by condenser lens 600 and phosphor 820 is irradiated with the blue light, phosphor 820 is excited to emit fluorescent light.

The fluorescent light emitted by phosphor 820 is focused by condenser lenses 600, reflected by dichroic mirror 500, passes through lens 700 and is directed to a subsequent optical system. Dichroic mirror 500 has a property of transmitting only blue light and reflecting light of other colors.

Figure 13B:
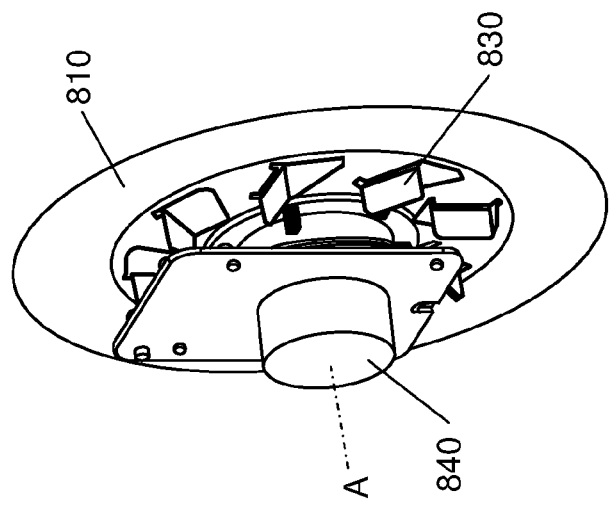
FIG. 13B is a perspective view illustrating a blade-portion-provided surface of the phosphor wheel in Embodiment 3.
Figure 13A:
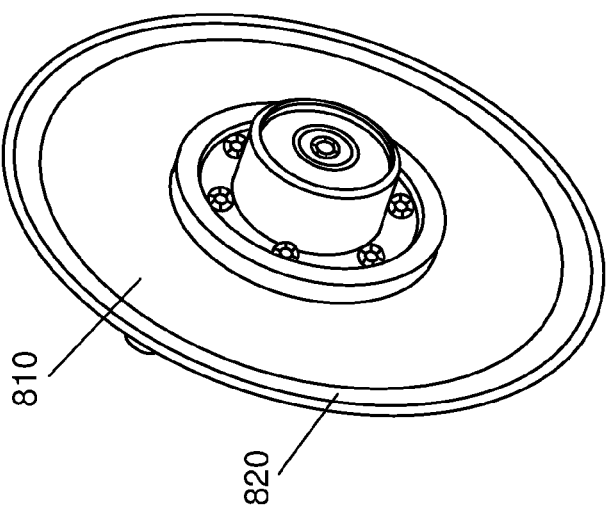
FIG. 13A is a perspective view illustrating a phosphor-provided surface of a phosphor wheel in Embodiment 3.

FIG. 13A is a perspective view illustrating a surface provided with phosphor 820 of phosphor wheel 800 in Embodiment 3. FIG. 13B is a perspective view illustrating a surface provided with blade portions 830 (blade members) of phosphor wheel 800 in Embodiment 3.

As illustrated in FIG. 13A, phosphor 820 is formed in a ring shape on the other surface of substrate 810 of phosphor wheel 800. Since phosphor 820 generates heat when irradiated with the blue light, substrate 810 is formed of aluminum, which has an excellent heat dissipation. As illustrated in FIG. 13B, a plurality of blade portions 830 for heat dissipation are provided on one surface of substrate 810. Motor 840 for rotationally driving substrate 810 about rotation shaft A is attached to substrate 810. Substrate 810 is rotationally driven by motor 840 about rotation shaft A, whereby the heat of phosphor 820 is dissipated from substrate 810 via blade portions 830 for heat dissipation.

Figure 14:
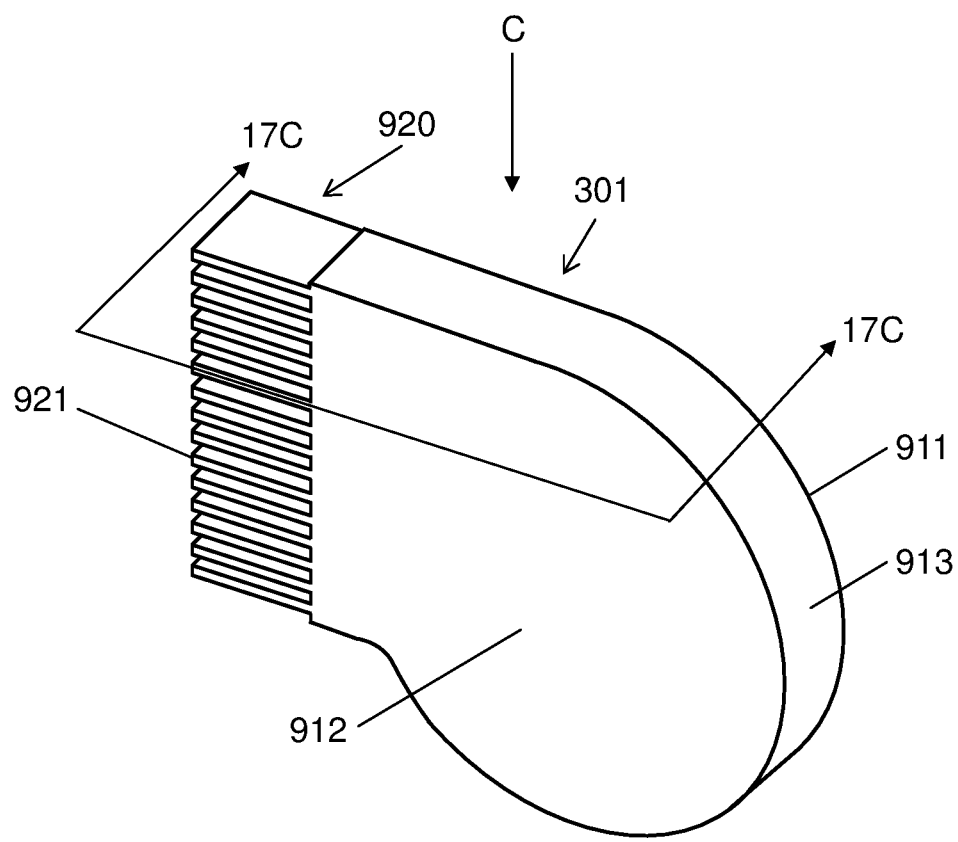
FIG. 14 is a perspective view illustrating an external appearance of a phosphor wheel cooling device in Embodiment 3.

FIG. 14 is a perspective view illustrating an external appearance of phosphor wheel cooling device 300 in Embodiment 3. Phosphor wheel 800 is attached to an inner portion of enclosure 301, and hermetically enclosed for maintaining airtightness. An contour of enclosure 301 is formed by first wall portion 911, second wall portion 912, lateral wall 913 provided between first wall portion 911 and second wall portion 912, and heat dissipater 920 provided on an end face defined by first wall portion 911, second wall portion 912, and lateral wall 913.

Figure 15:
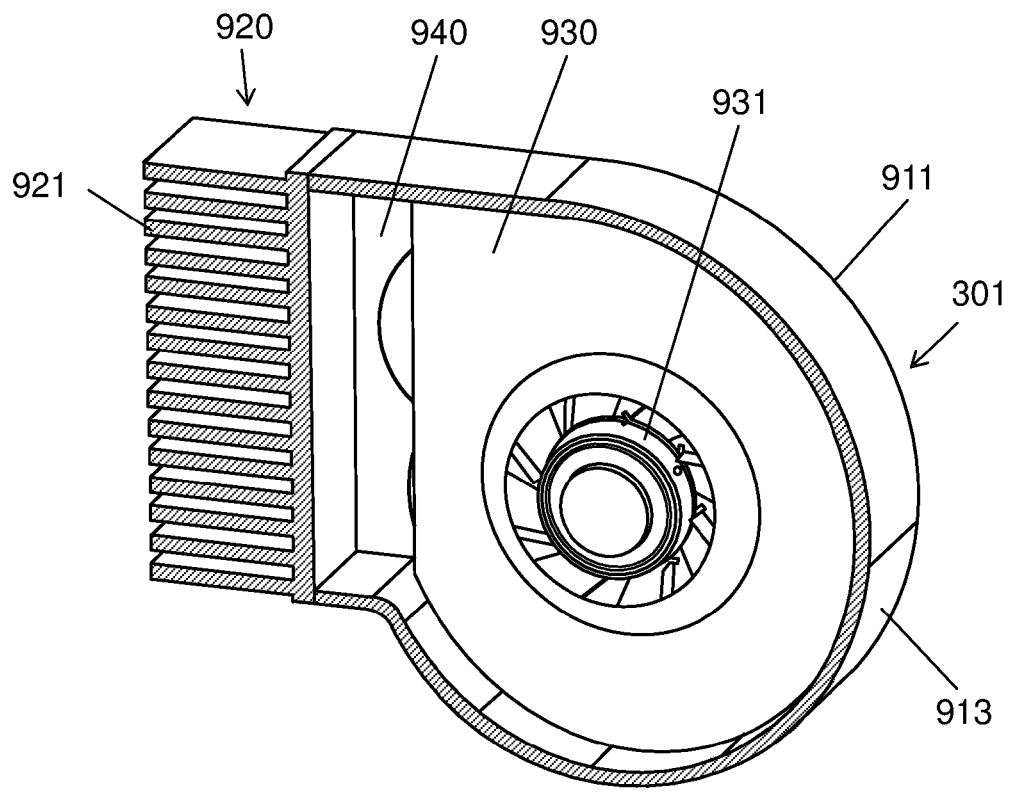
FIG. 15 illustrates a state in which a second wall portion of an enclosure is removed.
Figure 16:
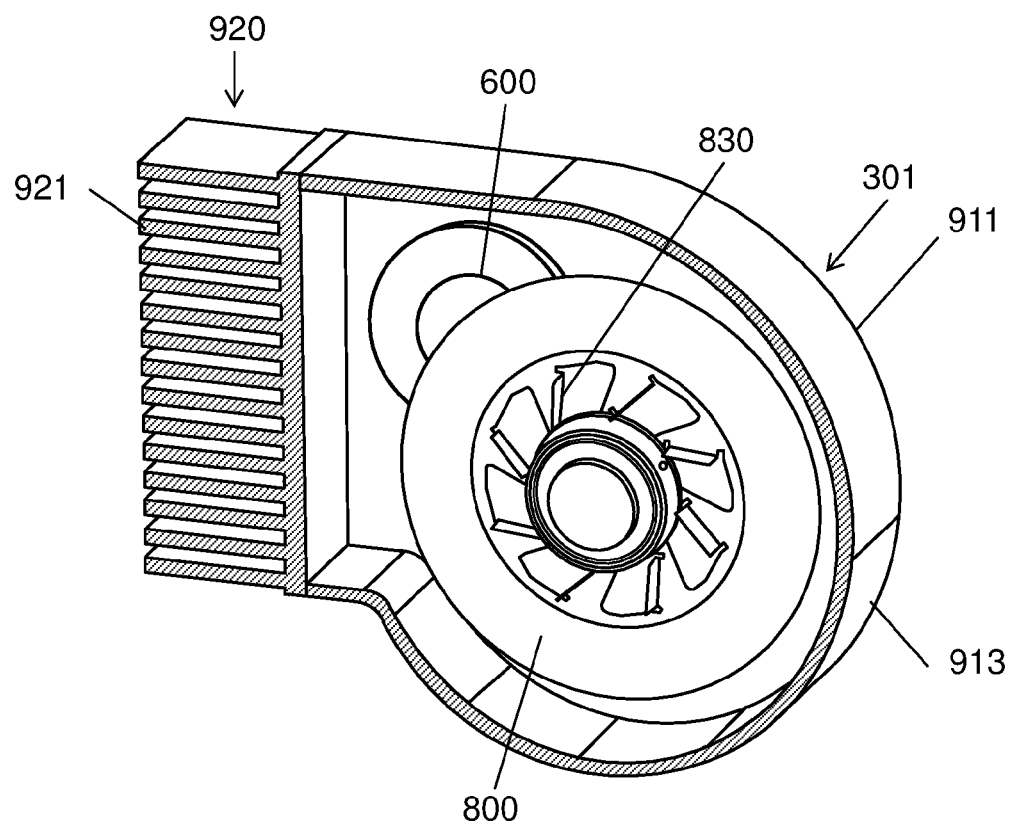
FIG. 16 illustrates a state in which a gas flow definer is removed from the state in FIG. 15.

FIG. 15 illustrates a state in which second wall portion 912 of enclosure 301 is removed. Between second wall portion 912 and one surface of substrate 810, gas flow definer 930 is provided. FIG. 16 illustrates a state in which gas flow definer 930 is removed from the state in FIG. 15. Phosphor wheel 800 is attached so that the surface of substrate 810 provided with phosphor 820 faces first wall portion 911. Condenser lens 600 is attached to first wall portion 911, which is a side of enclosure 301 toward phosphor wheel 800 to be attached, in such a manner as to maintain the airtightness of enclosure 301.

FIG. 17A to FIG. 17C each illustrate how the air flows (indicated by arrows) inside enclosure 301. FIG. 17A illustrates how the air flows between gas flow definer 930 and phosphor wheel 800 inside enclosure 301 in Embodiment 3. FIG. 17B illustrates how the air flows between gas flow definer 930 and second wall portion 912 inside enclosure 301 in Embodiment 3. FIG. 17C illustrates how the air flows inside enclosure 301 in Embodiment 3 by viewing from direction C a cross section of enclosure 301 taken along line 17C-17C in FIG. 14.

As becomes clear from FIG. 14 to FIG. 17C, gas flow definer 930 is provided so as to partition the inner portion of enclosure 301 into a space toward first wall portion 911 and a space toward second wall portion 912. Furthermore, gas flow definer 930 is provided so as to form communication portion 940 that connects the two spaces described above, and heat dissipater 920 is adjacent to communication portion 940. Moreover, opening 931 is provided in gas flow definer 930 in such a manner as to be close to rotation shaft A of the motor. The air that has been located on a side toward first wall portion 911 and heated by heat generation of phosphor 820 is blown to heat dissipater 920 including a plurality of fins 921 for heat dissipation and cooled down due to the rotation of blade portions 830 provided on substrate 810. Opening 931 is provided for the following purpose: the air that is cooled by heat dissipater 920 and bounces back from the space toward first wall portion 911 to the space toward second wall portion 912 via communication portion 940 is directed to the space toward first wall portion 911 again.

Figure 18:
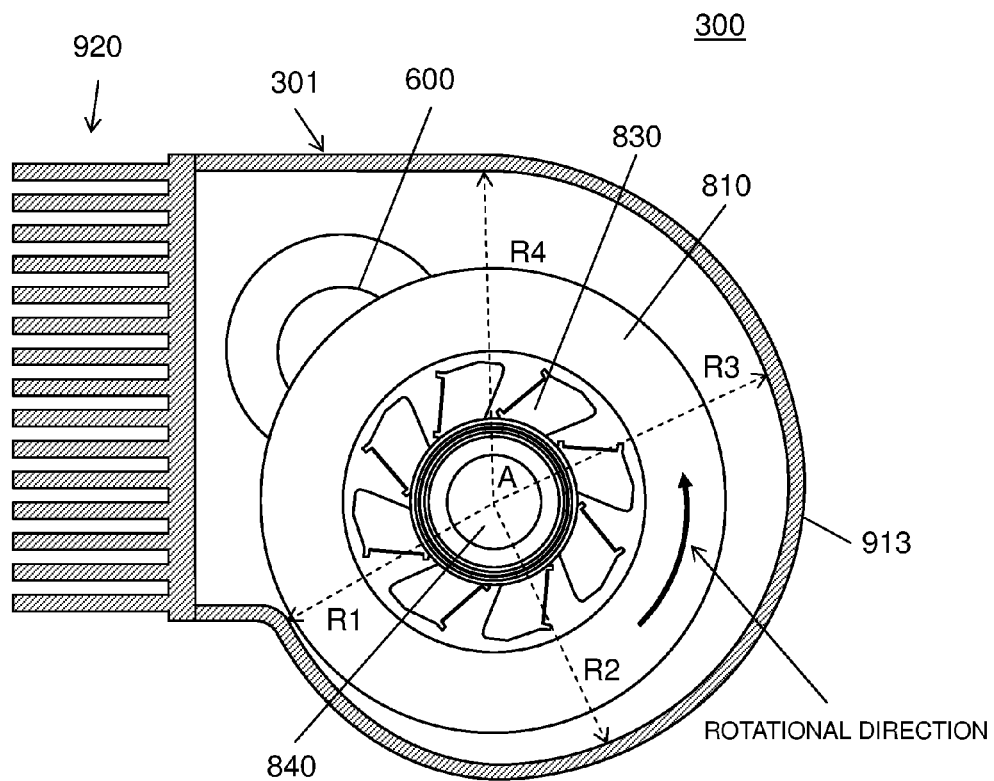
FIG. 18 illustrates a cross section of the enclosure in Embodiment 3 taken along a plane perpendicular to rotation shaft A.

FIG. 18 illustrates a cross section of enclosure 301 in Embodiment 3 taken along a plane perpendicular to rotation shaft A. A distance from a center of rotation shaft A of motor 840 to lateral wall 913 of enclosure 301 gradually increases along a rotational direction of substrate 810 of phosphor wheel 800 such as R1<R2<R3<R4.

In Embodiment 3, a whole of phosphor wheel 800 is hermetically enclosed inside enclosure 301. However, a part of a motor main body may be exposed to an outside of enclosure 301 while maintaining the airtightness of enclosure 301.

Phosphor wheel 800 is hermetically enclosed as described above in order to prevent the dust from adhering to phosphor 820, being irradiated with laser light and burning in phosphor 820.

The following is a description of an operation of phosphor wheel cooling device 300 configured as above.

Blue light, which serves as excitation light and is emitted by a plurality of blue semiconductor lasers 250, passes through lenses 400 and 450, dichroic mirror 500, and condenser lenses 600, and is focused onto phosphor 820 for irradiation. Phosphor 820 excited by the blue light temporarily turns from a stable ground state to an excited state with a high energy. Since the excited state is unstable, phosphor 820 immediately releases energy and returns to the stable ground state. This released energy turns to fluorescent light. However, not all of the released energy is converted to fluorescent light, but part of such energy turns to heat, causing a temperature increase of phosphor 820.

The heat generated in phosphor 820 is transmitted through roughly two paths. One is a path through which the heat is radiated from phosphor 820 serving as a heat source directly into the air, while the other is a path through which the heat is radiated from phosphor 820 into the air via substrate 810. Substrate 810 provided with phosphor 820 is rotationally driven by motor 840, so that a portion emitting the fluorescent light is constantly moved and the temperature increase in phosphor 820 is suppressed by an air flow caused by the rotation. Furthermore, blade portions 830 are provided on substrate 810 of phosphor wheel cooling device 300, thereby increasing a surface area of substrate 810 and enhancing a thermal transmission efficiency into the air. Additionally, substrate 810 provided with blade portions 830 is rotated by motor 840, thereby convecting the heated air and cooling it down in heat dissipater 920. Thus, a further temperature decrease is achieved.

As illustrated in FIG. 17A to FIG. 17C, the air that has been heated by the heat generated by light emission of phosphor 820 and located on the side toward first wall portion 911 is blown to heat dissipater 920 by blade portions 830 of rotating substrate 810. The air blown to heat dissipater 920 is cooled by heat exchange in heat dissipater 920, and bounces back via communication portion 940 to the space toward second wall portion 912. The air that has bounced back to the space toward second wall portion 912 flows through opening 931 of gas flow definer 930 to the space toward first wall portion 911.

More specifically, since the distance from rotation shaft A of motor 840 to the lateral wall of enclosure 301 varies gradually, the air that is heated by the heat generation due to the light emission of phosphor 820 and located on the side toward first wall portion 911 is subjected to a force in the rotational direction of substrate 810 and directed toward heat dissipater 920. The air that is blown to and impacts on a wall surface of heat dissipater 920 is subjected to heat exchange and cooled down. The air that has impacted on and bounced off heat dissipater 920 flows through communication portion 940 to the space toward second wall portion 912. The air that has reached the space toward second wall portion 912 is taken through opening 931 into the space toward first wall portion 911 again due to the rotation of blade portions 830 provided on substrate 810 of phosphor wheel 800, thus lowering the temperature of phosphor 820.

As described above, in accordance with Embodiment 3, phosphor 820 on substrate 810 of phosphor wheel 800 is constantly cooled by the air having a low temperature, thus making it possible to enhance the light conversion efficiency and increase the brightness of the fluorescent light. Furthermore, it is also possible to secure the reliability of a binder, etc. used for applying phosphor 820. Moreover, since the air is circulated within the space hermetically enclosed by enclosure 301, there is no occurrence of a decrease in light output due to the burning-in of the dust or the like.

Consequently, when the phosphor wheel cooling device described in Embodiment 3 is used in the projection-type image display apparatus, it is possible to keep stable brightness for a long period of time.

Embodiment 4

In the following, non-limiting Embodiment 4 will be described, with reference to FIG. 19A and FIG. 19B. A redundant description of the same structural elements as those in Embodiment 3 will be omitted. The following description will be directed only to what is different from Embodiment 3.

FIG. 19A is a perspective view illustrating a surface provided with blade portions 831 (blade members) of phosphor wheel 800 in Embodiment 4. FIG. 19B is a plan view illustrating the surface provided with blade portions 831 of phosphor wheel 800 in Embodiment 4.

As illustrated in FIG. 19A, blade portions 831 formed on substrate 811 of phosphor wheel 800 are spaced not uniformly but unevenly in a predetermined range along a circumferential direction of the substrate, and disposed such that a center of gravity of blade portions 831 coincides with a center of motor 840. In Embodiment 4, being spaced not uniformly means that not all of spacings (pitches) between blade portions 831 are equal and not all of angles of blade portions 831 are equal. In FIG. 19B, the spacings of blade portions 831 have a relationship of θ1<θ2<θ3<θ4 within an angular range of 120 degrees.

In general, when blades such as blade portions 831 turn, noise including a component of the order of rotation of [the number of blades×the number of rotations/60×natural number] is produced. However, by disposing blade portions 831 unevenly, the component of the order of rotation is dispersed, so that a high frequency component can be reduced.

In Embodiment 4, it is possible to produce an effect of improving a sound quality of the noise accompanied by the rotation of blade portions 831 in addition to the advantageous effects in Embodiments 1, 2, and 3.

Other Embodiments

The above description has been directed to embodiments serving as illustrative examples of a technique in the present disclosure. For that illustration purpose, the attached drawings and the detailed description have been provided.

Thus, the structural components mentioned in the attached drawings and the detailed description can include not only a structural component essential for solving problems but also a structural component that is not essential for solving the problems so that the above-mentioned technique is illustrated. Accordingly, from the appearance of that non-essential structural component in the attached drawings and the detailed description, such a non-essential structural component should not immediately be considered as essential.

Moreover, since the embodiments described above are for illustrating the technique in the present disclosure, they can be subjected to various modifications, replacements, additions, and omissions within a scope of the claims or a range of equivalency thereof.

For example, although Embodiments 1, 2, 3, and 4 have been directed to the case of applying the cooling device of the present disclosure to the cooling device for cooling down the phosphor wheel, the cooling device of the present disclosure is also applicable to a cooling device for cooling down a wheel other than the phosphor wheel. For example, the cooling device in the present disclosure can also be applied to a cooling device for cooling a disc (a wheel) that is hermetically enclosed in an enclosure of hard disk equipment and rotationally driven about a rotation shaft, and data writable and erasable by light irradiation.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to an apparatus that includes a semiconductor laser and a phosphor. More specifically, the present disclosure is applicable to a projector or the like. Furthermore, the present disclosure can also be applied to an electric appliance such as hard disk equipment in which a rotating body is hermetically enclosed and irradiated with light.

What is claimed is:

1. A cooling device that cools down a wheel having a disc shape, the wheel being hermetically enclosed in an enclosure and rotationally driven about a rotation shaft, the cooling device comprising:
   a plurality of blade members that are disposed on one surface of the wheel;
   a heat dissipater to which a gas heated by the wheel is blown by the plurality of blade members due to rotation of the wheel; and
   a gas flow definer that is located inside the enclosure, and separates a flow path along which the gas that has been cooled by the heat dissipater flows before being blown to the one surface and a flow path along which the gas that has been blown to the one surface and heated flows,
   wherein the heat dissipater includes a plurality of fin members, each of the plurality of fin members having a planar surface extending in a longitudinal direction and a width direction of the fin member, the width direction of each of the plurality of fin members extending perpendicular to a plane defined by the one surface of the wheel.

2. The cooling device according to claim 1, wherein the heat dissipater includes:
   a heat-receiving fin that is disposed inside the enclosure;
   a heat-dissipating fin that is disposed outside the enclosure; and
   a heat transport member that thermally connects the heat-receiving fin and the heat-dissipating fin.

3. The cooling device according to claim 2,
   wherein the gas flow definer has a duct shape,
   a gas-sending end of the gas flow definer is close to and faces the one surface of the wheel, and
   a gas-receiving end of the gas flow definer overlaps a lateral portion of the heat-receiving fin in such a manner as to be close to or in contact with the lateral portion.

4. The cooling device according to claim 2, wherein the heat transport member is a heat pipe.

5. The cooling device according to claim 1,
   wherein the enclosure includes an enclosure main body having a predetermined plane that is open, and an enclosure lid that closes the predetermined plane, the enclosure lid includes a heat-receiving fin, a heat-dissipating fin, and a lid portion, and the heat dissipater includes:

the heat-receiving fin that is located on an inner surface of the lid portion and formed into an integral piece with the lid portion;

the heat-dissipating fin that is located on an outer surface of the lid portion and formed into the integral piece with the lid portion; and a heat transport member, which is the lid portion, thermally connecting the heat-receiving fin and the heat-dissipating fin.

6. The cooling device according to claim 5, wherein the integral piece formed by the heat-receiving fin, the heat-dissipating fin, and the lid portion is a casting.

7. The cooling device according to claim 1, wherein the wheel is a phosphor wheel.

8. A projection-type image display apparatus comprising:
a light source including the cooling device according to claim 7, a laser light source, and a first optical system that focuses light from the laser light source onto a phosphor of the phosphor wheel;
an image display element that modulates incident light based on an image signal inputted by an external device;
a second optical system that emits light from the light source to the image display element; and
a third optical system that magnifies and projects light modulated by the image display element.

9. The cooling device according to claim 1,
wherein the wheel further includes a phosphor on an other surface of the wheel, the phosphor emitting light when being irradiated with excitation light, the enclosure further includes a first wall portion that faces the other surface of the wheel, a second wall portion that faces the one surface of the wheel, and a lateral wall that spaces the first wall portion and the second wall portion away from each other by a predetermined distance, and the gas flow definer further includes a portion provided between the second wall portion and the one surface of the wheel so as to partition the enclosure into a space toward the first wall portion and a space toward the second wall portion, a communication portion that connects the space toward the first wall portion and the space toward the second wall portion and is adjacent to the heat dissipater, and an opening that directs the gas bouncing off the heat dissipater, from the space toward the second wall portion to the space toward the first wall portion.

10. The cooling device according to claim 9, wherein a distance between the rotation shaft and the lateral wall of the enclosure gradually increases along a rotational direction of the wheel.

11. The cooling device according to claim 1, wherein the plurality of blade members are disposed unevenly in a predetermined range along a circumferential direction of the wheel.

12. A projection-type image display apparatus comprising:
the cooling device according to claim 9.

13. The cooling device according to claim 1, wherein the plurality of blade members disposed on the surface of the wheel are the sole means for circulating gas within the enclosure.

* * * * *